Nov. 29, 1938.   G. HUNT ET AL   2,138,170
AUTOMOBILE CLUTCH
Filed Feb. 9, 1938

Inventors
George Hunt &
William S. Wolfram

By Blackmore, Spencer & Hunt
Attorneys

Patented Nov. 29, 1938

2,138,170

UNITED STATES PATENT OFFICE 2,138,170

AUTOMOBILE CLUTCH

George Hunt and William S. Wolfram, Dayton, Ohio, assignors to General Motors Corporation, Detroit, Mich., a corporation of Delaware Application February 9, 1938, Serial No. 189,479

3 Claims. (Cl. 192—52)

This invention relates to friction clutches and it aims more particularly to improve the clutch by which the crankshaft of an engine of the motor vehicle is coupled to the transmission shaft.

An object of the invention is to effect a gradual engagement of the parts of such a clutch.

A further object is to improve the driven member which is adapted to be gripped between conventional driving members.

Another object is to include within such a driven member a plurality of driven facing carrying plates and yielding means operable to bias said plates to spaced relation.

Still further the invention contemplates a location of said yielding biasing means such as to avoid the heat generated by the friction of the engaging parts.

Other objects and advantages will be understood from the following description.

Figure 1:
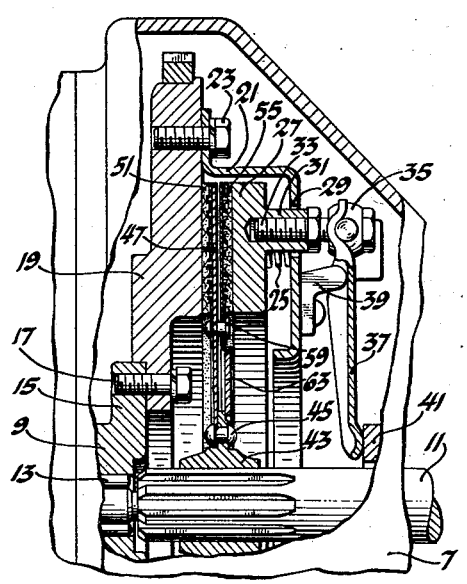
Figure 1 is a side elevation of a clutch housing, the housing being broken away and the clutch elements shown in section.
Figure 2:
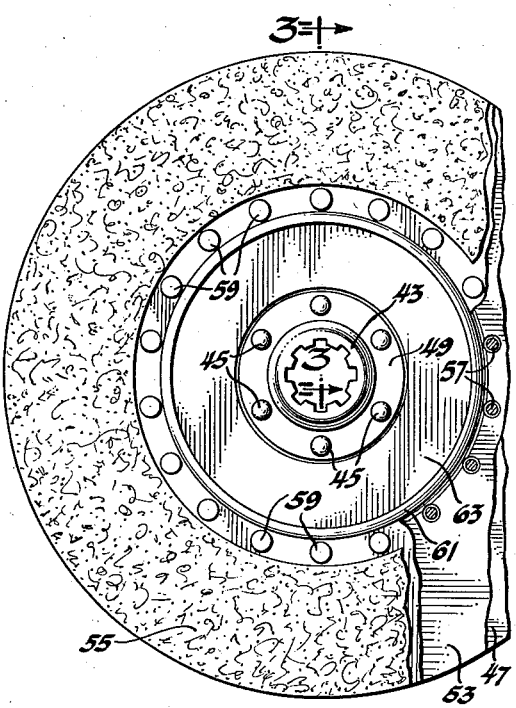
Figure 2 is a view in elevation of the driven member.

The invention will be described with the aid of reference characters on the several figures of the drawing.

Numeral 7 designates the housing for enclosing the clutch by which the engine shaft 9 drives the transmission shaft 11.

Shaft 11 is a terminal supported by bearings 13 in the end of shaft 9. To the flange 15 on engine shaft 9 is secured by fastening means 17 a flywheel 19. Flywheel 19 has a cover 21 secured by bolts 23, the cover serving as an abutment for a plurality of springs 25 which act to press the pressure plate 27 toward the flywheel and to grip the driven member in the usual way. Through openings 29 in the cover there project lugs 31 on the pressure plate 27. Threaded into these lugs are screws 33 having heads 35 engaged by fingers 37, the latter fulcrumed on lugs 39 secured to the cover. At 41 is a throwout collar adapted to be reciprocated by a suitable throwout lever to rock the fingers or levers 37 and withdraw the pressure plate from the flywheel.

Figure 3:
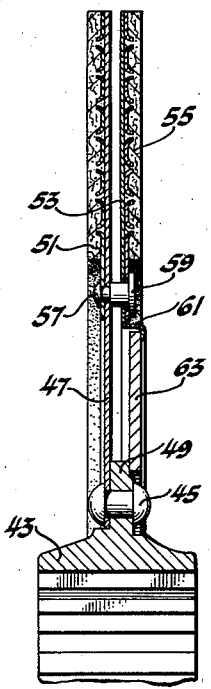
Figure 3 is a section on line 3—3 of Figure 2, the parts of the driven member being shown in spaced relation as when the clutch is disengaged.
Figure 4:
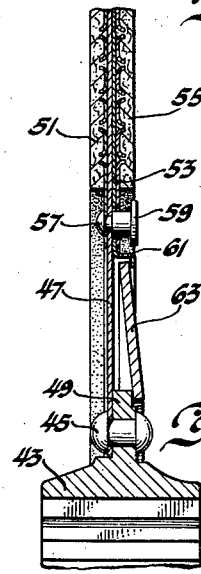
Figure 4 is a view like Figure 3 but with the parts displaced to clutch engaging position.

The novel structure of this invention is to be found in the driven member and the above brief description of the more or less conventional arrangement of parts with which my novel driven member is used will be sufficient for the purpose. On the driven shaft 11 is non-rotatably mounted a hub 43. Rivets 45 secure a driven plate 47 to the radial flange 49 of the hub. Driven plate 47 extends radially to a position between the pressure plate and flywheel. On the flywheel side is a suitable facing 51 which may be riveted or moulded thereon or otherwise secured thereto. Between driven plate 47 and the pressure plate 27 is a second plate 53. A facing 55 is moulded or otherwise secured to the second plate on the pressure plate side thereof. A plurality of shouldered rivets 57 are secured in a circular series to the driven plate 47. By means of holes in plate 53 this plate 53 may slide axially toward or from plate 57, being limited in its movement of separation by heads 59. Radially within the circle of rivets 57, plate 53 is bent axially and again slightly radially as shown at 61. A spring ring 63 surrounds and engages the hub as shown in Figures 3 and 4. The outer periphery of this ring engages under the lip or flange 61. When the clutch is released the lip occupies a position such that the ring 63 takes the form of a plane surface as shown in Figure 3. When the pressure plate moves toward the flywheel to grip the driven member and plate 53 is moved into contact with plate 47 incidental to such action the annular lip 61 moves the outer periphery of the ring 63 to the left, its inner periphery being held against the hub. This distorted condition of spring 63 is illustrated in Figure 4. The resilient resistance offered by such distortion of spring 63 acting against the clutch engaging springs 25, insures a gradual and smooth clutch operation. The stored-up energy in 63 is available to separate plates 47 and 53 when the clutch is released. The location of spring 63 is such that it is removed from the heat generated in the act of clutch engagement.

We claim:

1. In a clutch, spaced driving members, a driven member adapted to be gripped between said driving members, said driven member comprising a hub, a driven plate secured thereto, a parallel plate, facings on the remote surfaces of said driven and parallel plates, means whereby said parallel plate has a limited axial movement relative to said driven plate, a spring annulus surrounding said hub, and second means whereby said parallel plate engages the outer periphery of said annulus to stress the same when the parallel plate is moved to engage the driven plate.

2. The invention defined by claim 1, said first named means comprising a circular series of shouldered rivets secured to said driven plate upon which said parallel plate is slidably mounted.

3. The invention defined by claim 1, said second means comprising a lip formed on the inner part of said parallel plate, said lip overlying the outer edge of said spring annulus.

GEORGE HUNT.
WILLIAM S. WOLFRAM.